A. BENNETT, OF ROCKFORD, ILLINOIS.

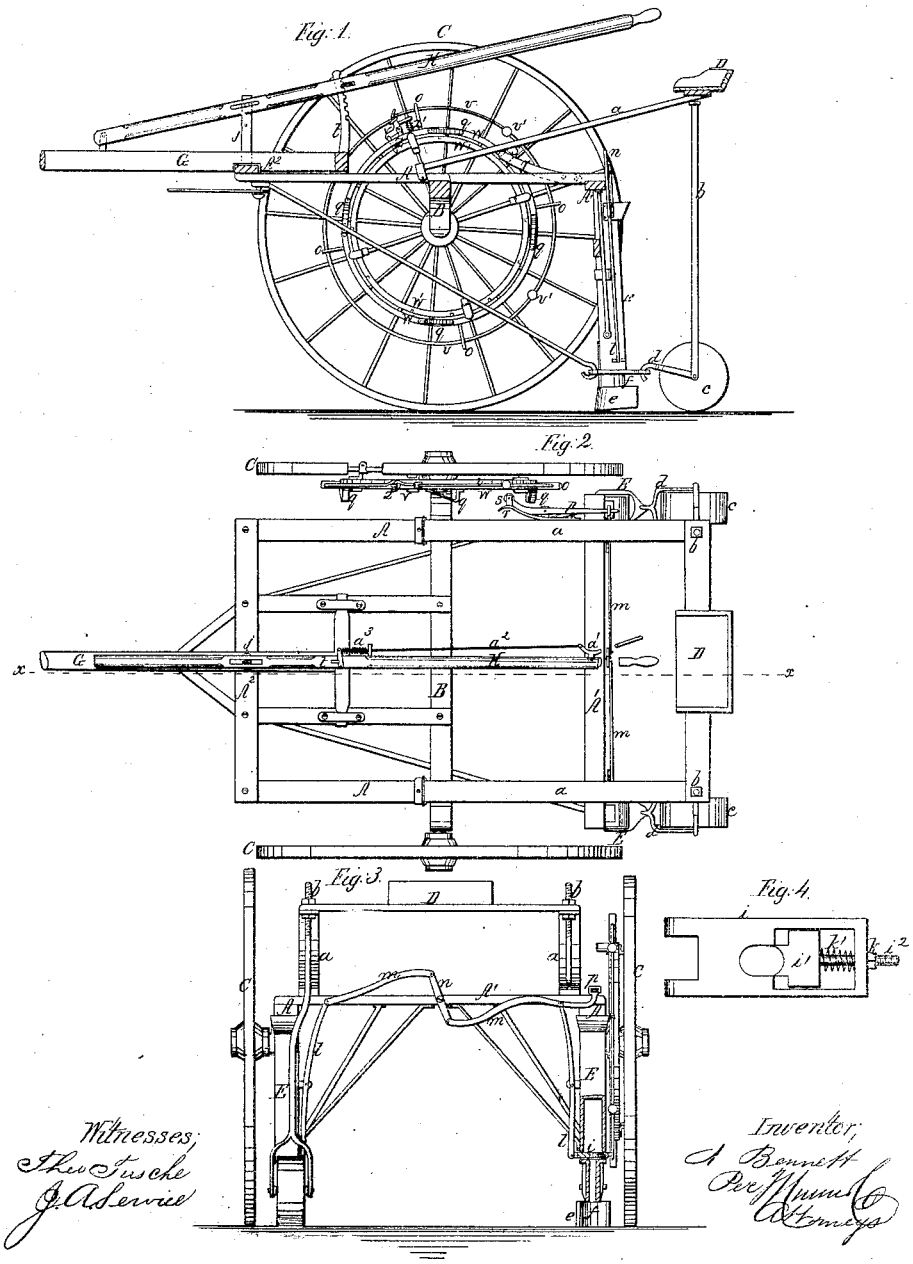

Letters Patent No. 62,595, dated March 5, 1867.

IMPROVEMENT IN SEED PLANTERS.

The Schedule referred to in these Letters Patent and making part of the same.

TO ALL WHOM IT MAY CONCERN:

Be it known that I, A. BENNETT, of Rockford, in the county of Winnebago, and State of Illinois, have invented a new and useful Improvement in Seed Planters; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved seed planter taken in the plane of the line $x\,x$, fig. 2.

Figure 2 is a top view of the same.

Figure 3 is a rear view of the same.

Figure 4 is a detached view of a part of the feeding apparatus.

Similar letters of reference indicate like parts.

This invention relates to an improvement in the construction of corn planters, whereby one man or boy with a double team may drop the grain at regular intervals in two rows, opening the furrow and rolling the seed after they are dropped at the same time, thus completing the planting in one operation by a self-acting apparatus.

A light rectangular frame A is mounted upon the axle B of the wheels C C. A driver's seat, D, is suspended behind upon the rear ends of two long bars $a\,a$, the front ends of the bars being pivoted on the upper side of the frame A, so that the rear ends on which the driver's seat is secured are supported by rods $b\,b$ that run down and carry on their lower ends the casters or rollers $c\,c$. The rollers $c\,c$ thus receive the weight of the driver; they are connected by clevis hooks $d\,d$ to the back part of the vertical grain boxes or chutes E E, which are fastened at their upper ends to the rear cross-beam $A^1$ of the frame A, and are intended to serve at once as hoppers and conveyers of the grain to the dropping apparatus at their lower ends. On the front side of the lower ends of the grain boxes E E are attached pointed shovel ploughs or furrow openers $e\,e$, between the wings of which are grain spouts $f\,f$ leading from the grain boxes, and separated by feeding slides $i\,i$ in the bottom of the boxes, shown on an enlarged scale in fig. 4. The slides $i\,i$ work laterally and horizontally in the bottom of the grain boxes E E, so that in their movement back and forth they admit a certain number of grains of corn from the boxes into the spouts $f\,f$, which drop them in the furrow made by the ploughs $e\,e$ to be be covered by the rollers $c\,c$ that follow. The number of grains to be dropped at regular intervals is regulated by an adjustable receiving hole in the slides $i\,i$, which is made larger or smaller for holding more or less grain, as desired, by means of sliding blocks $i^1\,i^1$ placed on the screws $i^2\,i^2$, that are operated by the nut $k\,k$ on the outside and the spiral springs $k^1\,k^1$, as shown clearly in fig. 4. The inner ends of the slides $i\,i$ are connected with upright rock-levers $l\,l$ that are pivoted to fulcra at or near their middle to the grain boxes E E, and the upper ends of which are connected with bent rods $m\,m$, both of which are attached on their inner ends to a short rock-lever, $n$, that is pivoted in its middle to the back part of the rear cross-beam $A^1$, as shown in fig. 3. The outer end of one of the rods $m$ is connected with the long arm of the side lever $p$, which carries on its forward end or short arm a small friction-roller, $s$, so placed that it shall be lifted by cams $q\,q$ on the inside of a concentric rim, $w$, affixed to the inside of one of the wheels C when the machine moves forward. The roller $s$ is pressed against the cams $q\,q$, by a spring, $r$, that is fastened to the side of the frame A, and bears upon the short arm of the side lever $p$, as shown in fig. 1. By this arrangement it is manifest that when the wheel C turns round as the machine moves forward, the cams $q\,q$ will raise the end of the side lever $p$, which operating on the connecting-rods $m\,m$ will work the long levers $l\,l$, and thus move the slides $i\,i$ back and forth to drop the grain at regular intervals in the furrows in the manner as before described. For the purpose of regulating the dropping of the grain in line with previous work on turning at the end of the field, the concentric rim $w$, which carries the cams $q\,q$, is made to fit upon an inside rim $w^1$ so that it can be moved around, and the position of the cams be shifted. A wire ring $u$ extends around the rim $w$, and passes loosely through holes in projecting pins $o\,o$ on the periphery of the rim, the ends of which wire are so connected with a bent lever, $v$, that by drawing upon the wire, the lever will lift a pin, $z$, from a hole in the periphery of the inside rim $w^1$, and release the outside rim $w$, through which the pin $z$ passes so that it can be moved, and thus allow the position of the cams $q\,q$ to be shifted, as desired. The pin $z$ is held in place, except when thus lifted, by a spiral spring $z^1$ on the opposite end of the bent lever $v$;

and for handling and moving the lever by the wire ring $u$ with facility, balls or knobs $u'$ are placed upon it between projecting pins $o\ o$. The draught-pole G is hung upon the frame A in such manner that the frame may be raised behind while the pole preserves its horizontal position for the purpose of elevating the lower ends of the grain boxes to clear the ground, when desired. This is effected by means of a long lever-bar, H, reaching from the rear end of the frame near the driver's seat to the draught-pole G forward of the frame A. The lever H is connected at its front end to the draught-pole, and is pivoted to the upper end of a fulcrum-bar, $j$, set on the front cross-beam $A^2$, and passing up through a slot in the draught-pole. At the rear end of the draught-pole is placed an upright rack-rod, $t$, which passes up through a slot in the lever-bar H. By raising the rear end of the lever-bar H in the position shown in fig. 1, the frame A and the draught-pole G will both be in the same plane; and the lower ends of the grain boxes with the ploughs $e\ e$ will reach the ground and be ready for operating; but when the rear end of the lever H is depressed, while the draught-pole will preserve its horizontal position, the hind end of the frame will be raised, and thus lift the grain boxes E E and the ploughs $e\ e$ from the ground. A lever handle, $a^1$, on the rear end of the lever-bar H, operates by a connecting wire, $a^2$, and a spiral spring, $a^3$, to lock and unlock the bar H to the rack-rod $t$, as desired.

Having thus described my invention, what I claim as new, and desire to secure by Letters Patent, is—

1. The arrangement of the seat D, the supporting rods $b\ b$, and the covering rollers $c\ c$, combined and operating as and for the purposes described.

2. The seed boxes E E, combined with the adjustable feeding slides $i\ i$, the ploughs $e\ e$, and the levers $l\ n\ p$ for operating the feeding slides, substantially as herein described.

3. The shifting concentric rim $w$, with the cams $q\ q$, in combination with the rim $w'$, and the shifting devices connected with them, arranged substantially as and for the purposes herein set forth.

4. The lever bar H, in combination with the draught-pole G for raising and lowering the hind end of the frame A, arranged substantially as and for the purposes herein described.

A. BENNETT.

Witnesses:
H. G. CLARK,
G. W. FORD.